3,331,897
PROCESS FOR THE FABRICATION OF FUEL ELEMENTS DESIGNED FOR HIGH-TEMPERATURE OPERATION

André Accary, Paris, Pierre Blum and Louis Bochirol, Grenoble, and Roger Caillat, Sevres, France, assignors to Commissariat à l'Energie Atomique, Paris, France
No Drawing. Filed Oct. 8, 1964, Ser. No. 402,644
Claims priority, application France, Oct. 17, 1963, 950,933; Aug. 8, 1964, 985,296
4 Claims. (Cl. 264—.5)

Fuel elements for nuclear reactors which operate at high temperature usually consist of a core of fuel material (pellets, slugs, etc.) which is placed within a can or jacket of graphite having low permeability to gases. It is known that fuel cans have the essential functions:

of endowing the fuel unit from satisfactory mechanical strength of permitting the transfer of heat generated within the fuel to the coolant fluid of nevertheless providing the maximum permissible insulation between the coolant and the fuel in order to prevent or at least to limit the contamination of the coolant circuit by the fission products.

The production of fuel elements of this type usually consists in:

The preparation of fuel pallets or slugs, in most cases by the dispersion within a carbonaceous matrix of granules or spherical particles which are coated with pyrocarbon, the carbonaceous matrix being usually obtained by the conventional methods employed in the carbon industry, that is to say, starting from graphite or graphitized petroleum coke which is subjected to cycles of impregnation (with either coal tar pitch or resin) and coking.

The machining, in a graphite of suitable grade, of tubes, hollow spheres and so forth which are designed to perform the function of cans and the machining of plugs or end-caps which are necessary to ensure the closure of said cans. These parts have either been rendered impermeable after pre-machining, for example, by means of a number of impregnations with resins followed by coking processes, or else coated with surface layers of impermeable pyrocarbon.

The assembly of fuel pellets (or slugs) within their can or jacket followed by the sealing of said jacket, for example by means of the techniques referred-to above (liquid impregnations followed by coking, pyrolytic deposition).

The fuel elements which are obtained as a result of this sequence of operations can have satisfactory characteristics. However, it will be understood that, on account of the large number of operations which are necessary for the fabrication of said fuel elements, the cost price thereof is of a high order.

The present invention is directed to a process for the fabrication of fuel elements designed for high-temperature operation; said process makes it possible to obtain improved results, particularly in regard to the impermeability of the fuel elements produced by adopting a cycle of operations which is much simpler and therefore less costly.

The process in accordance with the invention entails the successive stages which consist in preparing a core or kernel of refractory fuel by molding a plastic paste obtained by adding to a powder of refractory material a binder which is chemically compatible with said refractory material, in placing a jacket around the nuclear fuel, said jacket being made up of one or a number of superposed layers formed from a plastic paste which contains a refractory material and which is obtained in exactly the same manner as the paste which was previously used in the preparation of said core, in processing said fuel together with its jacket in a gaseous hydrocarbon atmosphere at a temperature within the range of 800 to 1,000° C. so as to form a bond between the fuel and the jacket and to ensure impermeability of said jacket.

In order to form the fuel core or kernel, a moldable or extrudable paste is prepared from the powdered refractory material to which graphite powder has been added, by incorporation of a binder which has high swelling power in the presence of water and a low coking yield (lower than 30%) and which can be chosen among the following products considered either alone or in combination: polysaccharides, gums, mucilages, starches, alginates, as dispersed in water. The particle size of the refractory materials can vary over a wide range, for example from a few microns to 400 microns. The percentage content of binder does not exceed 5%, this percentage being expressed in respect of the total weight of dry material with which said binder is incorporated.

In the case of hydrolyzable materials such as uranium carbides and uranium nitrides and in a more general manner, the carbides and nitrides of actinides and lanthanides, there is employed as binder the drying oils such as linseed oil or Chinese wood oil (tung oil) which is usually pre-thickened by blowing of hot air. It is also possible to make use of ethylcellulose dissolved in a volatile solvent such as, for example, orthodichlorobenzene, benzene and toluene.

The utilization of drying oils and ethylcellulose dissolved in a solvent proves to be particularly advantageous when it is desired to obtain good cohesion of the particles at the time of shaping of the plastic paste or when the plastic paste is to be applied in thin layers (surface coatings, fuel canning material, etc.).

The paste which is prepared in this manner is then shaped. The shaping operation is usually performed in the cold state by compression-molding or extrusion. The drying of the shaped products takes place either in free air at room temperature or within a chamber at a temperature which is lower than 100° C.

There is thus obtained a fuel core which can either be made impermeable by means of a thermal cracking process or else not be subjected to this treatment and allowed to retain its porosity.

It is also possible to employ an intermediate method which consists in subjecting the fuel core to a partial thermal cracking process and in modifying the processing-time factor, which in turn permits said fuel core to be provided at will with a certain degree of strength and impermeability. The choice between these different possibilities will depend amongst other things on the thickness of the protective jacket and of the fuel core as well as on the thickness of the cores employed for the fuel assembly, thus determining the most economical solution in the case considered.

The protective jacket will be formed of a refractory material which is chosen as a function of the design operating conditions of the reactor. In the majority of cases, the jacket will be made of a carbonaceous material such as graphite.

However, in certain applications, it will prove advantageous to replace the graphite either partially or wholly by another material. Accordingly, it will be possible to employ beryllium oxide which is very stable at high temperature and which has excellent neutron-moderating properties. In this case, beryllium oxide could also be introduced in the composition of the fuel core. Fuel elements of this type could prove of particular value when employed in reactors designed for space rockets.

The protective jacket is prepared from a paste which is obtained in exactly the same manner as the paste which has previously been used in the preparation of the fuel core.

It is important to note that, by making provision for a jacket which has a porous structure and which is prepared by the same process as the fuel core, it is possible by means of the subsequent treatment involving the thermal cracking of the hydrocarbon to form a mechanical bond as well as to ensure impermeability and thus to create an excellent thermal bond between the fuel and the jacket in which the fuel is encased.

If the nuclear fuel is intended to be placed within a container or does not have to undergo any machining operation, a jacket which is made up of a single layer will prove sufficient. However, it will be an advantage, in order to improve the impermeability and strength of the coating material or to facilitate the machining thereof, to make provision for a jacket which is made up of two or more superimposed layers. The method of reparation of a jacket of this type essentially consists in applying by molding over the nuclear fuel a first layer which consists of a refractory material and which is prepared in the manner hereinbefore described, in subjecting said first layer to a process of impregnation with hydrocarbons at a temperature within the range of 800 to 1,000° C. in such a manner as to make said layer as impermeable as possible, and in forming a surface pyrocarbon zone, in molding a second layer over said first layer, in subjecting said second layer to a thermal cracking of hydrocarbons at a temperature within the range of 800 to 1,000° C.

Aside from the fact that this superposition improves the impermeability of the coating, the outer layer is thereby permitted to a greater or lesser extent to undergo either mechanical or chemical alteration either during the machining process or during the operation of the fuel element, without thereby producing any appreciable increase in the permeability of the coating as a whole.

The first layer, namely the layer which is in contact with the nuclear fuel, is formed from a refractory material having a particle size which is preferably smaller than 100μ. As a result of a suitable choice of particle size and processing conditions, said first layer is made as impermeable as possible in conjunction with a superficial pyrocarbon zone. For the purpose of forming the outer layer, namely the layer which is in contact with the heat-transfer fluid, the starting material employed is a powder having a particle size which is usually comprised within the range of 20 to 100μ. This second layer is rendered impermeable throughout its entire mass by thermal cracking of hydrocarbons. This process last referred-to also permits the possibility of forming a bond between the layers.

In view of the small thickness of the outer layer which is of the order of one millimeter, there are preferably employed in the preparation of said layer binders such as drying oils or diethylcellulose dissolved in a solvent which is more or less volatile depending on the dimensions of the parts to be treated.

There now follows a description of a number of different examples which are given without any limitation being implied and which relate to the practical application of the process according to the invention for the fabrication of fuel elements which are designed for high-temperature operation. The practical arrangements which will be described in connection with these examples must be considered as forming part of the invention, it being understood that any equivalent arrangements could equally well be employed without thereby departing from the scope of this invention.

EXAMPLE 1

Uranium oxide particles of spheroidal shape having a mean diameter of the order of 100μ are admixed in a proportion of 13 parts of $UO_2$ per 100 parts of artificial graphite with 1.5 parts of vegetable gum having high swelling power in the presence of water and having a coking yield of 28%. There is then added a suitable proportion of water (approximately 25 parts) in order to obtain a paste of thick consistency.

The paste is then compression-molded in the shape of balls 4 centimeters in diameter.

There is additionally prepared a molding compound which contains the following constituent materials: 98 parts of artificial graphite dust having a particle size which is comprised between 50 and 100μ and 2 parts of vegetable gum. After mixing these constituents in the cold state, there is then added the quantity of water which is necessary for the purpose of obtaining a paste of thick consistency, namely approximately 30 parts.

The following operation consists in charging a mold of suitable shape with the paste which has been referred-to above and in carrying out the cold molding of balls 6 centimeters in diameter, there having been previously placed in the center of said balls the above-mentioned spheroidal fuel particles which were prepared separately and which thus serve as fuel cores, or kernels. The pressure applied in the molding process is only 25 bars.

After drying in free air over a period of 48 hours, the objects are placed in a muffle-type furnace, the temperature of which is progressively increased during a period of approximately 20 hours to 900° C. whilst a circulation of natural gas is maintained within the said furnace at a pressure which is slightly higher than normal pressure. (The natural gas employed is produced at Lacq in southwest France and has the following approximate composition: methane 93%, ethane 4%, propane 0.6%, nitrogen 1.3%, and a few other impurities in small proportions.)

The above process is continued for a period of 350 hours, following which a weight gain of 76% of the processed balls is noted. Accordingly, an impervious coating or jacket has thus been formed in a single piece around the fuel core, the density of which after processing is 1.90 g./cc.

After a slight mechanical grinding operation, the element finally produced is ready for use within a reactor of the so-called "pebble bed" type.

EXAMPLE 2

The starting material employed was identical with the material used in the preparation of the fuel cores in the previous example. The said paste was shaped in the form of a cylinder having a diameter of 25 millimeters and an equivalent height.

In addition, an extrudable carbonaceous compound is prepared with the following constituents:

Artificial graphite dust, 96 parts by weight (of which approximately 50 parts are comprised between 100 and 200μ, the remainder being smaller than 100μ).

Vegetable gum, 4 parts, (the same gum as in Example 1), which is carefully mixed in the cold state and has added to it the quantity of water (35 parts) which is necessary for the purpose of obtaining after mixing a paste having a thick consistency which is extruded, still in the cold state, in the form of tubes having an internal diameter of 26 millimeters and an external diameter of 50 millimeters, and 1,500 millimeters in length.

There are additionally prepared by compression-molding solid parts having a closely related composition which are adapted to fit over the ends of the tubes with a clearance of the order of one-tenth of a millimeter and which thus serve as plugs or end-caps for the purpose of closing said tubes.

The tubes are then filled with fuel pellets and the end-caps fitted in position after the parts have been subjected to a drying process in free air for a period of approximately ten days after shaping.

The fuel assemblies are then placed in a tubular muffle-type furnace of substantial length, and the processing is performed as has been indicated in the previous example.

There is thus performed at the same time the densification of the jackets thus formed and the leak-tight closure of these latter: measurements of impermeability to gases show that the impermeability of the jacket, the density of which is 1.92 g./cc., is lower than $10^{-8}$ cm.$^2$/s. Moreover, it can be noted that the mechanical characteristics are excellent and that the compressive strength in particular is 950 bars.

It is also possible by means of another mode of execution to obtain after assembly a fuel cylinder which is identical with that which has just been described and which is placed in the interior of a single-unit jacket constituted in the central region thereof by a tubular portion which is applied in close contact with the fuel cylinder and at the two extremities thereof by full cylindrical portions which perform the function of end-caps. For this purpose, the shaping operation is carried out in three stages, namely: extrusion of a full portion of the jacket followed by co-extrusion of the tubular portion of the jacket and of the fuel cylinder, thereby applying the jacket in close contact with the fuel and, finally, a further extrusion of a full portion of the jacket.

EXAMPLE 3

The fuel core was fabricated in accordance with the process described in the previous examples.

The final product was in the form of a cylinder 10 millimeters in diameter and 20 millimeters in height. The core was surrounded by compression-molding with a first layer which was formed from a graphite powder having a particle size within the range of 0 to 80$\mu$ with addition of vegetable gum and water. Said layer had a thickness of 2 millimeters. The layer was then subjected to a strengthening process over a period of 50 hours at 900° C. in natural gas. The said layer was then processed for a further period of 300 hours at 900° C. until a superficial pyrocarbon zone was formed at the surface thereof.

There was then applied to said first layer a second layer which was formed from a graphite powder having a particle size within the range of 40 to 80$\mu$. Diethylcellulose was then added to said graphite powder in a proportion of 1% in respect of the weight of graphite and dissolved in ortho-dichlorobenzene (10 to 20% in respect of the weight of graphite.) The thickness of the layer was 1 millimeter. Said layer was treated with natural gas for a period of 300 hours at 875° C. This treatment has the effect of rendering said layer impermeable throughout its mass and at the same time forms a bond between the layers.

The coefficient of permeability of the jacket in this case was found to be less than $10^{-8}$ cm.$^2$/s. and was no longer measurable by usual means.

What we claim is:

1. Process for the fabrication of nuclear reactor fuel elements for high temperature operation comprising the steps of molding a fuel core from a plastic paste of a mixture of a refractory powder having a particle size up to 400 microns, a fissionable material and a binder of low coking yield and high swelling power in the presence of water chemically compatible with said refractory powder and in amounts from 2–5% by weight, molding a jacket of at least two layers around said fuel core from a plastic paste of a mixture of a refractory powder and a binder chemically compatible with said refractory powder, said layers having a refractory material particle size from 20–100$\mu$ and a thickness of from 1 to 2 millimeters and then, after formation of each of said layers, simultaneously bonding said jacket to said fuel core and rendering said jacket impermeable by thermal cracking a gaseous hydrocarbon at a temperature between 800° and 1000° C. in the pores of said fuel core and said jacket for about 300–350 hours.

2. Process as described in claim 1, said binders being selected from the group consisting of polysaccharides, gums, mucilages, starches and alginates.

3. Process as described in claim 1, the binder for said jacket being selected from the group consisting of drying oils and ethylcellulose.

4. Process as described in claim 1, said gaseous hydrocarbon being an unpurified natural gas.

References Cited
UNITED STATES PATENTS

| | | | |
|---|---|---|---|
| 3,135,665 | 6/1964 | Koutz et al. | 176—91 |
| 3,158,547 | 11/1964 | Smith | 264—.5 |
| 3,164,487 | 1/1965 | Carley-Macauly, et al. | 176—91 |
| 3,212,989 | 10/1965 | Fitzer et al. | 176—67 |

L. DEWAYNE RUTLEDGE, *Primary Examiner.*

CARL D. QUARFORTH, *Examiner.*